(No Model.) 2 Sheets—Sheet 1.
F. O. REED.
FEED TROUGH.
No. 434,806. Patented Aug. 19, 1890.
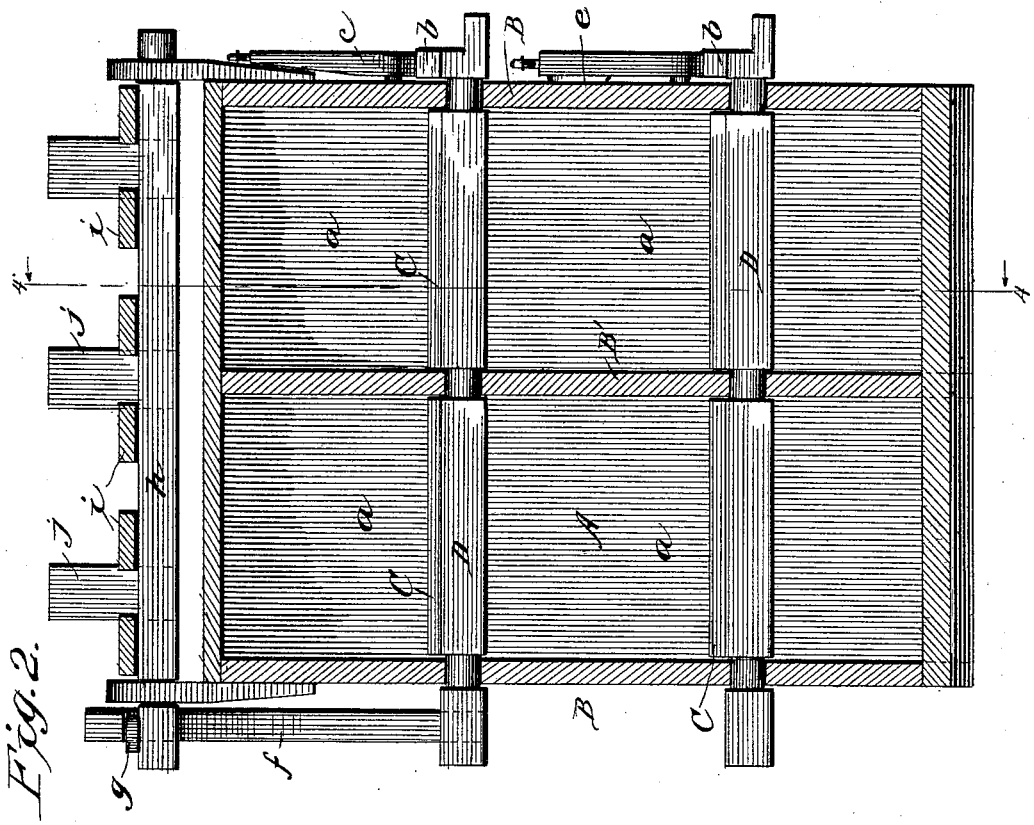
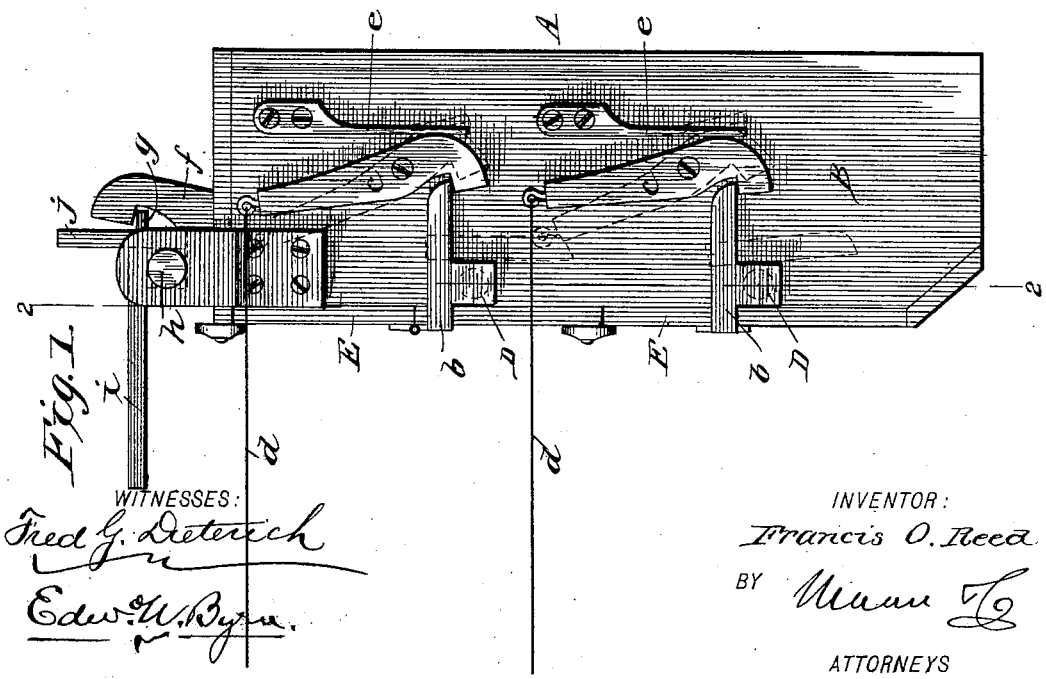
WITNESSES:
Fred G. Dieterich
Edw. W. Byrn.
INVENTOR:
Francis O. Reed
BY Munn & Co
ATTORNEYS (No Model.) 2 Sheets—Sheet 2.
F. O. REED.
FEED TROUGH.
No. 434,806. Patented Aug. 19, 1890.
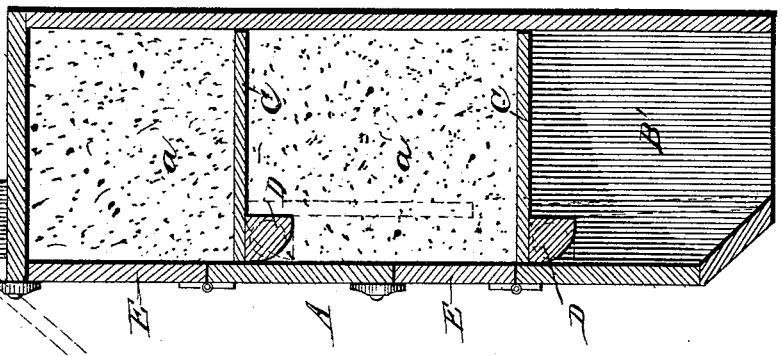
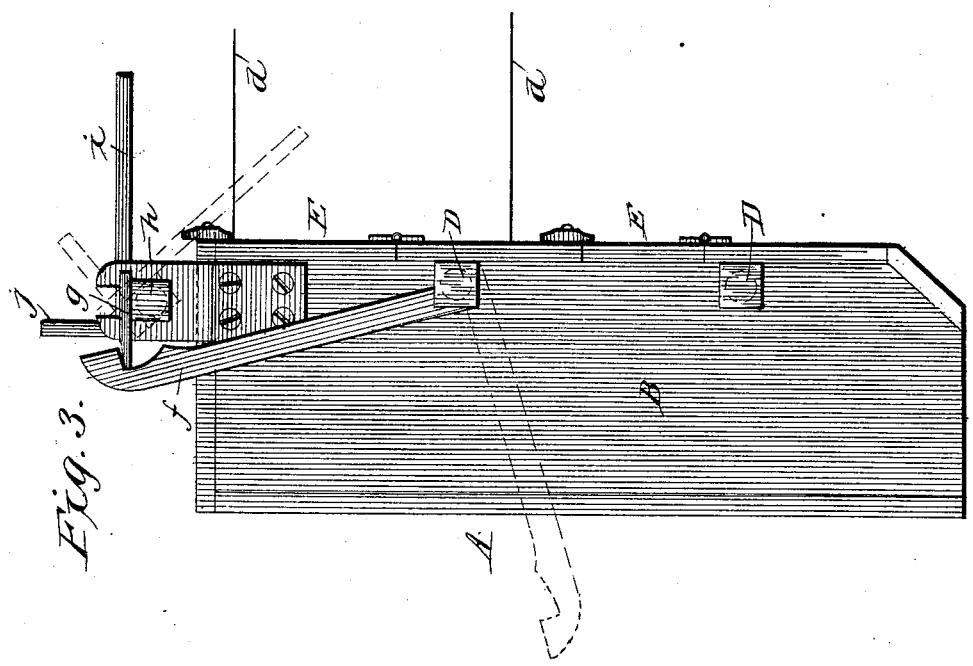
WITNESSES:
Fred G. Dieterich
Edw. H. N. Byrn.
INVENTOR:
Francis O. Reed
BY Munn & Co.
ATTORNEYS
THE NORRIS PETERS CO., PHOTO-LITHO., WASHINGTON, D. C.

UNITED STATES PATENT OFFICE.

FRANCIS O. REED, OF PARIS, TEXAS, ASSIGNOR OF ONE-HALF TO DANIEL P. HOLLON, OF SAME PLACE.

FEED-TROUGH.

SPECIFICATION forming part of Letters Patent No. 434,806, dated August 19, 1890.

Application filed November 29, 1889. Serial No. 332,050. (No model.)

*To all whom it may concern:*

Be it known that I, FRANCIS O. REED, of Paris, in the county of Lamar and State of Texas, have invented a new and useful Improvement in Stock-Feeders, of which the following is a specification.

The object of my invention is to provide a stock-feeder which shall permit of the feeding of a measured quantity of food to cattle in the barn or stable from a point remote, so as to enable the farmer or any of the members of his family to feed the cattle from the dwelling without going out into the weather.

It consists in the peculiar construction and arrangement of the feeding device, in combination with one or more pull-wires leading to the house, as will be hereinafter fully described.

Figure 1 is a side elevation of the device. Fig. 2 is a front view with the case in section. Fig. 3 is a side elevation from the side opposite to Fig. 1, and Fig. 4 is a vertical transverse section.

A represents a vertical box or casing formed by sides B and one or more partitions B' into a series of vertical chambers. These chambers are subdivided horizontally into a series of compartments $a$ by drop-valves or wings C, which are attached rigidly to a set of rotary shafts D, journaled in bearings in the sides and partitions of the case. The compartments into which the vertical chambers are subdivided by the drop-valves are each of a size adapted to hold enough grain or solid food for one feed. (See Fig. 4.) There may be any number of these vertical chambers and drop-valves and any number of rotary shafts.

Each shaft has upon its end where it extends outside of the case a rigid locking-arm $b$, Figs. 1 and 2, which is adapted to be held up by the hooked end of a catch-lever $c$, which is fulcrumed near its middle, and has attached to its upper end by an eye or loop the wire or cord $d$, running to the house or to any other suitable point, even as far away as a mile. The lower hooked end of the lever is forced under the arm $b$ of the rotary shaft by a spring $e$, and when so engaged the shaft cannot rotate, and the weight of grain on the wings or drop-valves of that shaft is sustained, as in Fig. 4. As soon, however, as a pull is made upon the wire or rope from a distance the lower end of the catch-lever is withdrawn from arm $b$ of the rotary shaft, and the weight of the feed on all the drop-valves of that shaft causes the shaft to turn and the valves of that shaft to fall, as shown in dotted lines, beneath the weight of the feed, which latter is deposited into troughs below. This box or case is intended to be placed in elevated position, so that the feed falls into the feed-trough of each animal, which troughs, being of the ordinary construction, are not shown. When it is time for the next feed, the wire leading to the lever of the next shaft above and its row of valves is pulled upon, and so on, until the whole series is exhausted. As shown, the doors E for filling these compartments are arranged in the front of the case, but they may as well be placed in the back. I also propose to arrange one or more of the shafts so as to give two kinds of feed—one of grain and the other of hay—and for this purpose the shaft D at the top of the series has upon its end opposite the trip-lever a rigid arm $f$, (see Fig. 3,) having a hooked upper end, which is adapted to catch over a rigid arm $g$ on a horizontal shaft $h$, provided with slats $i$ and $j$, forming a tilting rack for hay. When this rack is loaded with hay and the shaft bearing the drop-valves turn to deposit the grain feed, the motion of said shaft causes hooked arm $f$ to be removed from the arm $g$, as shown in dotted lines, Fig. 3, which allows the rack bearing the hay to tilt and the hay to be pitched down a chute or hatchway. Whenever a pull is made upon the wire from the house or other remote point, the operator can tell whether or not the pull has been effective by applying the ear to the wire, which acts as a mechanical telephone to convey to the ear of the operator the sound of the falling grain.

Having thus described my invention, what I claim as new is—

1. The combination of a box or casing having a series of vertical chambers and vertical partitions B', a series of horizontal shafts D passing through all the vertical partitions and chambers and having attached to them drop-valves fitting in the cross-section of the vertical chambers and arranged a distance apart therein, representing a single feed, the locking-arm $b$, fixed to the end of the shafts, the pivoted catch-lever $c$, having pull-wire $d$, and the spring $e$ for holding the catch-lever engaged with the locking-bar, substantially as shown and described.

2. The combination of the box or casing, the horizontal shaft with drop-valves or wings attached, locking and tripping devices for the shaft, and a tilting hay-rack and locking and tripping devices for connecting it to and operating it by the shaft bearing the drop-valves, substantially as shown and described.

FRANCIS O. REED.

Witnesses:
W. T. VOIERS,
P. H. PATRICK.